(12) United States Patent
Kaiser et al.

(10) Patent No.: US 10,977,547 B2
(45) Date of Patent: Apr. 13, 2021

(54) CONVOLUTIONAL GATED RECURRENT NEURAL NETWORKS

(71) Applicant: Google LLC, Mountain View, CA (US)

(72) Inventors: Lukasz Mieczyslaw Kaiser, Mountain View, CA (US); Ilya Sutskever, San Francisco, CA (US)

(73) Assignee: Google LLC, Mountain View, CA (US)

( * ) Notice: Subject to any disclaimer, the term of this patent is extended or adjusted under 35 U.S.C. 154(b) by 607 days.

(21) Appl. No.: 15/349,867

(22) Filed: Nov. 11, 2016

(65) Prior Publication Data

US 2017/0140263 A1    May 18, 2017

Related U.S. Application Data

(60) Provisional application No. 62/254,702, filed on Nov. 12, 2015.

(51) Int. Cl.
*G06N 3/04* (2006.01)
*G06F 17/16* (2006.01)
*G06N 3/08* (2006.01)

(52) U.S. Cl.
CPC .......... *G06N 3/0445* (2013.01); *G06F 17/16* (2013.01); *G06N 3/0454* (2013.01); *G06N 3/08* (2013.01)

(58) Field of Classification Search
CPC .......... G06N 3/02; G06N 3/0445; G06N 3/08; G06F 17/16
See application file for complete search history.

(56) References Cited

U.S. PATENT DOCUMENTS

2013/0212052 A1   8/2013  Yu et al.
2015/0161991 A1   6/2015  Sak et al.

FOREIGN PATENT DOCUMENTS

JP   2007-305072   11/2007
JP   2009-080693   4/2019

OTHER PUBLICATIONS

Chung et al., Empirical Evaluation of Gated Recurrent Neural Networks on Sequence Modeling, 2014. (Year: 2014).*
Berger, Mark J., Large Scale Multi-label Text Classification with Semantic Word Vectors, Jun. 2015. (Year: 2015).*
Tang et al., Document Modeling with Gated Recurrent Neural Network for Sentiment Classification, Proceedings of the 2015 Conference on Empirical Methods in Natural Language Processing, pp. 1422-1432, Sep. 2015. (Year: 2015).*
Li et al., LightRNN: Memory and Computation-Efficient Recurrent Neural Networks, NIPS 2016, Oct. 2016. (Year: 2016).*

(Continued)

*Primary Examiner* — Kamran Afshar
*Assistant Examiner* — Marshall L Werner
(74) *Attorney, Agent, or Firm* — Fish & Richardson P.C.

(57) ABSTRACT

Methods, systems, and apparatus, including computer programs encoded on computer storage media, for implementing a convolutional gated recurrent neural network (CGRN). In one of the systems, the CGRN is configured to maintain a state that is a tensor having dimensions x by y by m, wherein x, y, and m are each greater than one, and for each of a plurality of time steps, update a currently maintained state by processing the currently maintained state through a plurality of convolutional gates.

19 Claims, 3 Drawing Sheets

(56) References Cited

OTHER PUBLICATIONS

Shi et al., Convolutional LSTM Network: A Machine Learning Approach for Precipitation Nowcasting, Advances in Neural Information Processing Systems 28 (NIPS 2015), 2015. (Year: 2015).*
Yu et al., Video Paragraph Captioning using Hierarchical Recurrent Neural Networks, pp. 1-11, Oct. 2015. (Year: 2015).*
Angluin. "Learning regular sets from queries and counterexamples," Information and Computation, 75, Nov. 1987, 20 pages.
Bandanau et al. "Neural machine translation by jointly learning to align and translate," arXiV preprint arXiv:1409.0473, Sep. 1, 2014, 15 pages.
Blumensath "Automatic Structures," Proceedings of the 15th Annual IEEE Symposium on Logic in Computer Science, 2000, 12 pages.
Chan et al. "Listen, attend and spell," arXiv preprint arXiv:1508.01211, Aug. 5, 2015, 16 pages.
Cho et al. "Learning phrase representations using mn encoder-decoder for statistical machine translation," arXiv preprint arXiv:1406.1078, Jun. 3, 2014, 15 pages.
Chung et al. "Empirical evaluation of gated recurrent neural networks on sequence modeling," arXiv preprint arXiv1412.3555, Dec. 11, 2014, 9 pages.
Dahl et al. "Context-dependent pre-trained deep neural networks for large-vocabulary speech recognition," IEEE Transactions on Audio, Speech & Language Processing, 20(1), Jan. 2012, 13 pages.
Graves et al. "Neural turing machines," arXiv preprint arXiv:1410.5401, Oct. 20, 2014, 26 pages.
Grefenstette et al. "Learning to transduce with unbounded memory," Advances in Neural Information Processing Systems, 2015, 9 pages.
Greff et al. "LSTM: A search space odyssey," IEEE transaction on neural networks and learning systems, Jul. 9, 2016, 18 pages.
Gulwani. "Dimensions in program synthesis," Proceedings of PPDP 2010, Jul. 26, 2010, 12 pages.
Hochreiter et al. "Long short-term memory," Neural computation, 9(8) Nov. 15, 1997, 46 pages.
Joulin et al. "Infering algorithmic patterns with stack-augmented recurrent nets," Advances in neural information processing systems, 2015, 9 pages.
Kaiser. "Learning games from videos guided by descriptive complexity," Proceedings of the AAAI-12, AAAI Press, Jul. 14, 2012, 7 pages.
Kalchbrenner et al. "Recurrent continuous translation models," EMNLP, vol. 3(39), Oct. 2013, 10 pages.
Kalchbrenner et al. "Grid long short-term memory," arXiv preprint arXiv:1507.01526, Jul. 6, 2015, 15 pages.
Kingma et al. "Adam: A method for stochastic optimization," arXiv preprint arXiv:1412.6980, Dec. 22, 2014, 15 pages.
Kitzelmann et al. "Inductive programming: A survey of program synthesis techniques," International Workshop on Approaches and Application of Inductive Programming, Spring Berlin Heidelberg, Sep. 4, 2009, 24 pages.
Krizhevsky et al. "Imagenet classification with deep convolutional neural network," In Advances in Neural Information Processing Systems, 2012, 9 pages.
Lavin et al. "Fast algorithms for convolutional neural networks," Proceeding of the IEEE Conference on Computer Vision and Pattern Recognition, 2016, 9 pages.
Pham et al. "Dropout improves recurrent neural networks for handwriting recognition," in International Conference on Frontiers in Handwriting Recognition (ICFHR), IEEE, Sep. 1, 2014, 6 pages.
Shi et al. "Convolutional LSTM network: A machine learning approach for precipitation nowcasting," In Advances in Neural Information Processing Systems, 2015, 9 pages.
Srivastava et al. "Highway networks," arXiv preprint arXiv:1505.00387, May 3, 2015, 6 pages.
Sutskever et al. "Sequence to sequence learning with neural networks," In Advances in Neural Information Processing Systems, 2014, 9 pages.
Toderici et al. "Variable rate image compression with recurrent neural networks," arXiv preprint arXiv:1511.06085, Nov. 19, 2015, 12 pages.
Vinyals et al. "Grammar as a foreign language," in Advances in Neural Information Processing Systems, 2015, 9 pages.
Vinyals et al. "Show and tell: A neural image caption Generator," IEEE Conference on Computer Vision and Pattern Recognition, 2015, 9 pages.
Vivien. "An Introduction to Cellular Automata," 2003 Retrieved from Internet URL<https://www.irif.fr/~yunes/ca/archives/bookvivien.pdf> 412 pages.
Welling et al. "Bayesian learning via stochastic gradient Langevin dynamics," In Proceedings of ICML, 2011, 8 pages.
Zaremba et al. "Learning to execute," arXiv preprint arXiv, Oct. 17, 2014, 25 pages.
Zaremba et al. "Reinforcement learning neural turing machines," arXiv preprint arXiv: 1505.00521 362, May 2015, 13 pages.
International Search Report and Written Opinion in International Application No. PCT.US2016/061670, dated Feb. 23, 2017, 12 pages.
Chung et al. "Gated Feedback Recurrent Neural Networks," ICML, Feb. 9, 2015, 9 pages.
Cho et al. "On the Properties of Neural Machine Translation. Encoder-Decoder Approaches," ArXiv Preprint arXiv 1409.1259, Sep. 3, 2014, 9 pages.
Tjandra et al. "Gated Recurrent Neural Tensor Network," International Joint Conference on Neural Networks, Jul. 24, 2016, 8 pages.
JP Office Action in Japanese Appln. No. 2018-524364, dated Jul. 8, 2019, 10 pages (with English translation).
JP Decision to Grant a Patent in Japanese Appln. No. 2018-524364, dated Feb. 6, 2020, 5 pages (with English translation).
KR Office Action in Korean Appln. No. 10-2018-7016385, dated Jan. 30, 2020, 8 pages (with English translation).
Tang et al., "Document Modeling with Gated Recurrent Neural Network for Sentiment Classification," Proceedings of the 2015 Conference on Empirical Methods in Natural Language Processing, Sep. 2015, 1422-1432.
EP Office Action in European Application No. 16806343.6, dated Sep. 16, 2020, 6 pages.
KR Office Action in Korean Application No. 10-2018-7016385, dated Aug. 8, 2020, 10 pages (with English translation).

* cited by examiner

CONVOLUTIONAL GATED RECURRENT NEURAL NETWORKS

CROSS-REFERENCE TO RELATED APPLICATION

This application claims priority to U.S. Provisional Application No. 62/254,702, filed on Nov. 12, 2015. The disclosure of the prior application is considered part of and is incorporated by reference in the disclosure of this application.

BACKGROUND

This specification relates to neural network system architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a Long Short-Term Memory (LSTM) neural network that includes one or more LSTM cells that each include an input gate, a forget gate, and an output gate that allow the cell to store previous states for the cell, e.g., for use in generating a current activation or to be provided to other components of the LSTM neural network.

SUMMARY

This specification describes technologies that relate to recurrent neural network architectures.

In general, a convolutional gated recurrent neural network (CGRN) includes multiple convolutional gated recurrent units (CGRUs) and maintains a state tensor that has dimensions x by y by m, with x, y, and m each being greater than one.

At each of multiple time steps, the CGRN is configured to update the currently maintained state tensor by processing the currently maintained state tensor through each of the CGRUs. After the last time step, the state tensor is processed by an output layer that generates a system output.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. The architecture of the CGRN as described in this specification allows a CGRN to be highly parallel, i.e., because the CGRN is constructed from the highly parallel convolution operator, making the CGRN less computationally intensive to train and more computationally efficient to run, i.e., to compute an inference using the CGRN. The architecture of the CGRN allows the CGRN to generalize to inputs of different sizes, e.g., allows a CGRN trained on shorter inputs to effectively compute inferences for longer inputs.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
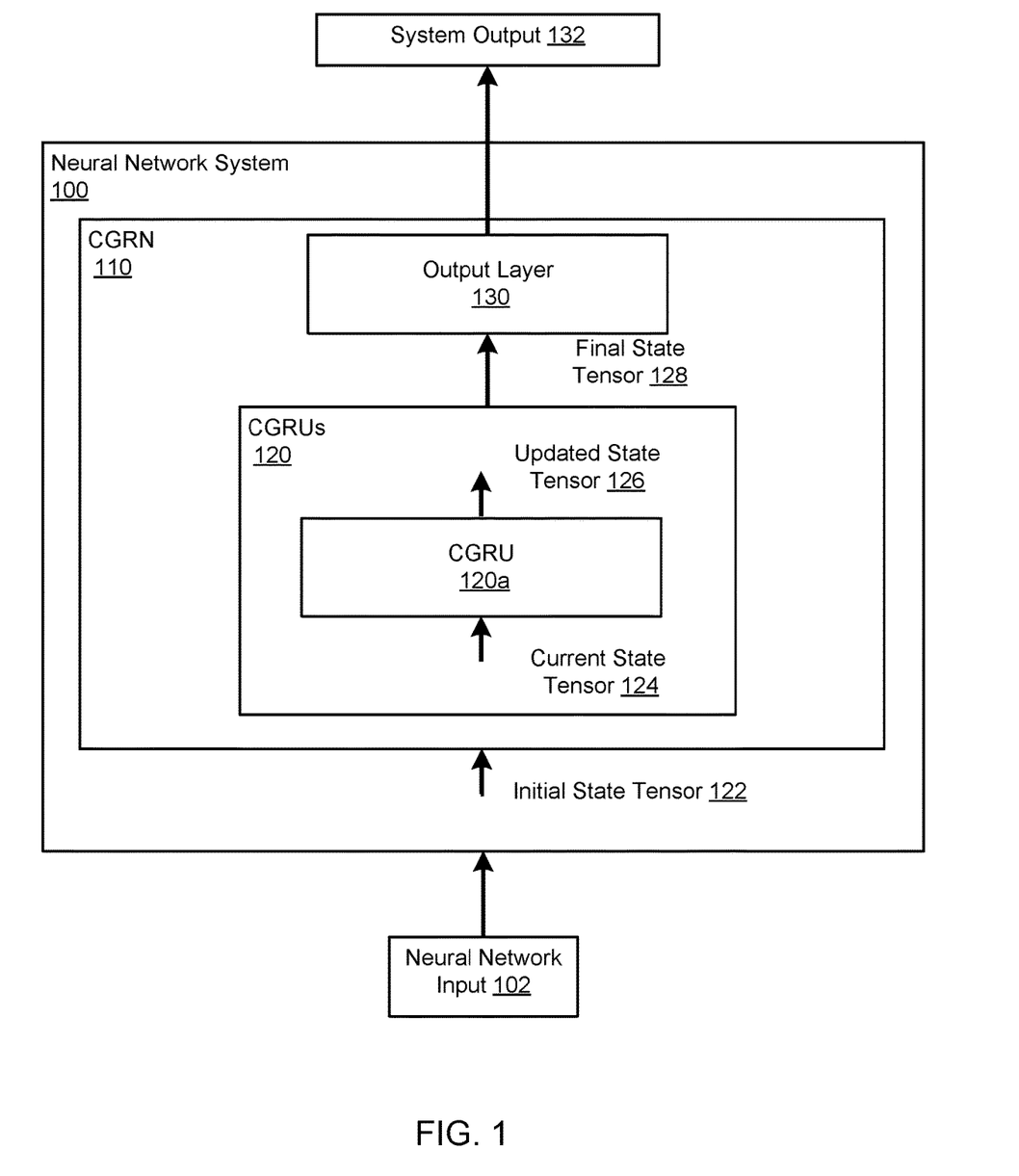
FIG. 1 shows an example neural network system.

FIG. 1 shows an example neural network system 100. The neural network system 100 is an example of a system implemented as computer programs on one or more computers in one or more locations, in which the systems, components, and techniques described below are implemented.

The neural network system 100 is a machine learning system that receives a neural network input and generates a system output from the neural network input. For example, the neural network system 100 can receive a neural network input 102 and generate a system output 132. Generally, the neural network input is a sequence of numeric inputs, e.g., vectors or other ordered collections of numeric values, and the system output can be a single vector or a sequence of multiple vectors.

The neural network system 100 can store the generated system outputs in an output data repository or provide the system outputs for use for some immediate purpose, e.g., by providing data characterizing the system output for presentation to a user or by providing some or all of the system output to another system for further processing.

The neural network system 100 can be configured to receive any kind of digital data input and to generate any kind of score, classification, or regression output based on the input.

As an example, if the input to the neural network system 100 is a sequence representing text in one language, the output generated by the neural network system 100 may be a sequence representing text in another language that is a translation of the input text into the other language.

As another example, if the input to the neural network system 100 is a sequence representing features of a spoken utterance, the output generated by the neural network system 100 may be a sequence representing text that is the transcription for the utterance.

As another example, if the input to the neural network system 100 is a sequence representing text, the output generated by the neural network system 100 may be a score for each of a set of topics, with the scores representing likelihoods that the corresponding topic is the topic of the text sequence.

As another example, if the input to the neural network system 100 is a sequence representing text, the output generated by the neural network system 100 may be a sequence representing text that is a summarization of the input text, i.e., that is shorter than the input text sequence.

In particular, the neural network system 100 includes a convolutional gated recurrent neural network (CGRN) 110. The CGRN 110 includes a sequence of convolutional gated recurrent units (CGRUs) 120 and an output layer 130.

Generally, the CGRUs receive an initial state tensor 122 that is generated from the neural network input 102 and collectively repeatedly update the initial state tensor 122 to generate a final state tensor 128.

That is, the CGRN 110 maintains a state that is a tensor that has dimensions x by y by m, with x, y, and m each being greater than one and that is initialized from the neural network input 102. Initializing the state tensor from the neural network input 102 is described in more detail below with reference to FIG. 2. The CGRUs 120 collectively repeatedly update the maintained state tensor to generate the final state tensor 128.

More specifically, the CGRUs 120 perform processing at each of multiple time steps. At each time step, each CGRU receives an input state tensor, updates the input state tensor, and provides the updated state tensor to another component of the CGRN, i.e., to another CGRU or to the output layer. For example, at a given time step of the multiple time steps, a CGRU 120a in the sequence can receive a current state tensor 122 and process the current state tensor 126 to generate an updated state tensor 126. The final state tensor 128 is the state tensor generated by the last CGRU in the sequence for the last time step of the multiple time steps.

The output layer 130 processes the final state tensor 128 to generate the system output 132. Processing the final state tensor 128 is described in more detail below with reference to FIG. 2.

Figure 2:
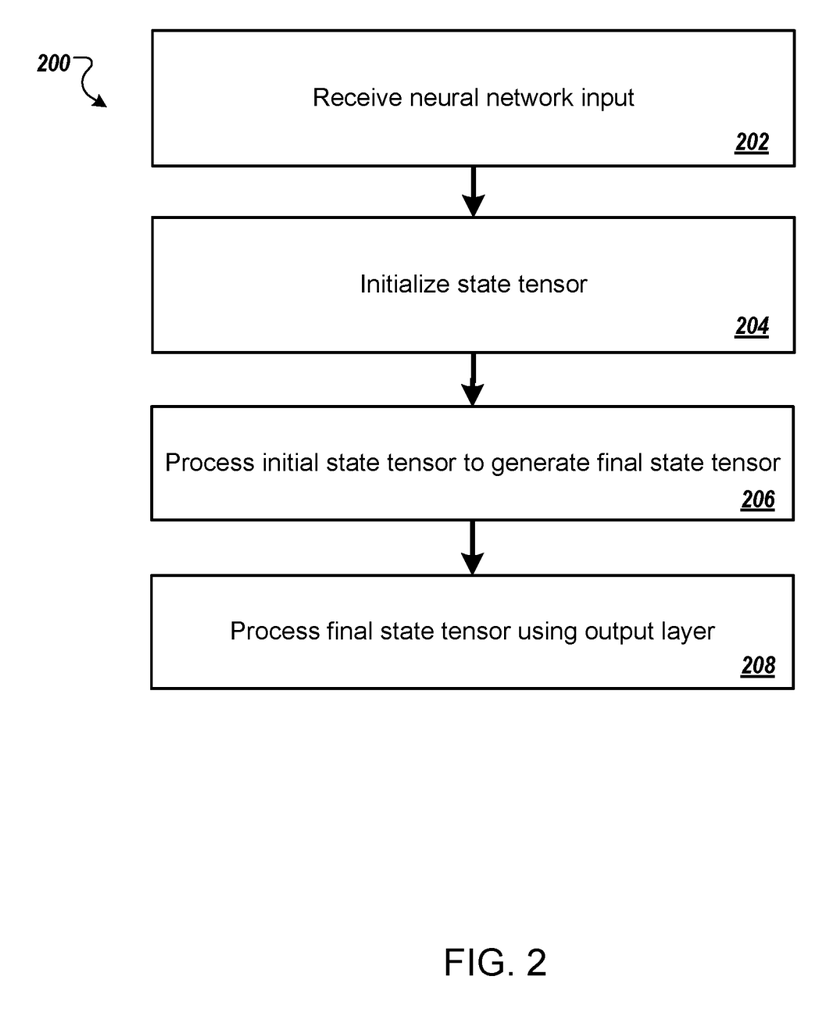
FIG. 2 is a flow diagram of an example process for processing a neural network input using a CGRN.

FIG. 2 is a flow diagram of an example process 200 for processing a neural network input using a CGRN. For convenience, the process 200 will be described as being performed by a system of one or more computers located in one or more locations. For example, a neural network system, e.g., the neural network system 100 of FIG. 1, appropriately programmed in accordance with this specification, can perform the process 200.

The system receives a neural network input (step 202). Generally, the neural network input is a sequence of vectors each having a length m. For example, the sequence can be a sequence of embedding vectors that each represent a respective input from a vocabulary of possible inputs.

The system initializes a state tensor of the CGRN using the neural network input (step 204). In particular, the system concatenates each input vector into the first column of the state tensor and sets all other entries of the state tensor to zero. That is, the k-th vector in the sequence is added to the state tensor at entries (0,k,0) through (0,k,m) and the entries in columns 1 through x−1 are set to zero.

The system processes the initial state tensor through the sequence of CGRUs for multiple time steps to generate a final state tensor (step 206). In particular, at each of the time steps, the system processes a current state tensor through each of the CGRUs in the sequence to generate an updated state tensor for the sequence. Processing an input state tensor by a CGRU is described in more detail below with reference to FIG. 3.

The system processes the final state tensor using the output layer to generate a CGRN output, i.e., a system output for the received neural network input (step 208).

In particular, the output layer is configured to apply an output parameter matrix to each depth vector of the first column of the final state tensor, with the k-th depth vector of the first column being the entries at (0,k,0) to (0,k,m) of the final state tensor, to generate a respective initial output vector from each depth vector of the column.

In some implementations, the output layer is then configured to select the maximal entry from each initial output vector to generate a final output vector, i.e., so that the final output vector is a vector of the respective maximal entries from each of the initial output vectors.

Figure 3:
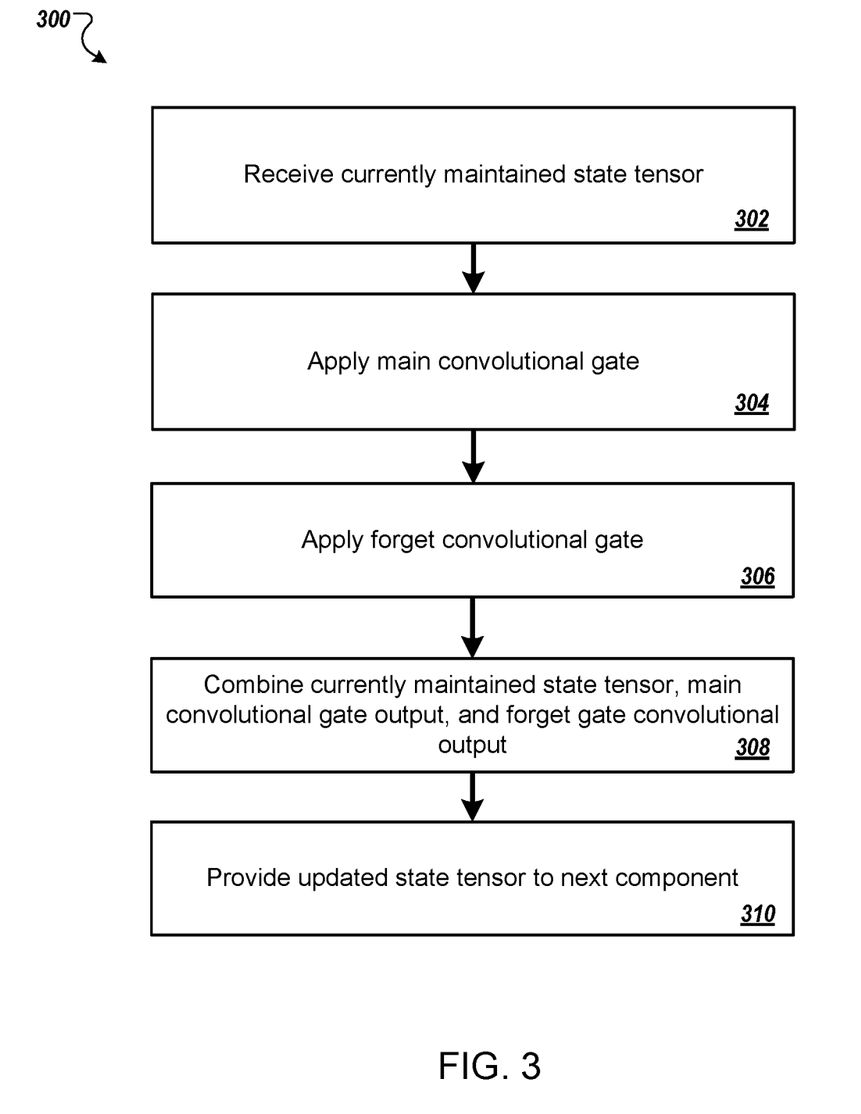
FIG. 3 is a flow diagram of an example process for processing a currently maintained state tensor at a current time step using a CGRU to update the currently maintained cell state tensor.

FIG. 3 is a flow diagram of an example process 300 for processing a currently maintained state tensor at a current time step using a CGRU to update the currently maintained cell state tensor. For convenience, the process 300 will be described as being performed by a CGRU implemented by a system of one or more computers located in one or more locations. For example, a CGRU in a neural network system, e.g., the CGRU 120a of the neural network system 100 of FIG. 1, appropriately programmed in accordance with this specification, can perform the process 300.

The CGRU receives the currently maintained state tensor (step 302). If the current time step is the first time step and the CGRU is the first CGRU in the sequence, the state tensor is the state tensor that has been initialized from the neural network input. If the current time step is not the first time step and the CGRU is the first CGRU in the sequence, the state tensor is the state tensor that has been generated by the last CGRU in the sequence at the immediately preceding time step. If the CGRU is not the first CGRU in the sequence, the state tensor is the state tensor that has been generated by the preceding CGRU in the sequence for the current time step.

The CGRU applies a main convolutional gate to the currently maintained state tensor to generate a main convolutional gate output (step 304). In particular, the CGRU performs a convolution between a main kernel bank for the CGRU and the currently maintained state tensor. A kernel bank is a 4-dimensional tensor of shape $[k_x, k_y, m, m]$, i.e., it contains $k_x \cdot k_y \cdot m^2$ parameters, where $k_x$ and $k_y$ are kernel width and height. The convolution of a kernel bank with a state tensor generates a new tensor that has the same dimensionality as the state tensor.

When performing a convolution of a filter bank having shape $[k_x, k_y, m, m]$ with a mental image s, the value of entry [x, y, i] of the resulting tensor satisfies:

$$\sum_{u=-\frac{k_x}{2}}^{\frac{k_x}{2}} \sum_{v=-\frac{k_y}{2}}^{\frac{k_y}{2}} \sum_{c=1}^{m} s[x+u, y+v, c] \cdot U[u, v, c, i].$$

In some implementations, the main convolutional gate output g satisfies:

$g=\sigma(U'*s+B')$, where s is the currently maintained state tensor, $U'*s$ is convolution of the main kernel bank of the main convolutional gate and the state tensor, and B' is a bias vector for the main convolutional gate.

The CGRU applies a forget convolutional gate to the currently maintained state tensor to generate a forget convolutional gate output (step 306). In particular, the CGRU performs a convolution between a forget kernel bank for the CGRU and the currently maintained state tensor. In some implementations, the forget convolutional gate output r satisfies:

$$r=\sigma(U'''*s+B''),$$

where $U'''*s$ is a convolution of the forget kernel bank and the currently maintained state tensor, and $B''$ is a bias vector for the forget convolutional gate.

The CGRU combines the currently maintained state tensor, the main convolutional gate output, and the forget convolutional gate output to generate an updated state tensor (step 308). That is, the CGRU applies both the main convolutional gate output and the forget convolutional gate output to the currently maintained state tensor to generate the updated state tensor. In some implementations, the updated state tensor satisfies:

$$CGRU(s)=u\cdot s+(1-u)\cdot \tan h(U^*(r\cdot s)+B)$$

where U is an output kernel bank of the GRU, B is a bias vector for the output of the GRU, and $r\cdot s$ signifies pointwise vector multiplication.

The CGRU provides the updated state tensor to a next component in the CGRN (step 310). In particular, if the CGRU is not the last CGRU in the sequence, the CGRU provides the updated state tensor to the next CGRU in the sequence. If the CGRU is the last CGRU in the sequence and the current time step is not the last time step, the CGRU provides the updated state tensor to the first CGRU in the sequence for processing at the next time step. If the CGRU is the last CGRU in the sequence and the current time step is the last time step, the CGRU provides the updated state tensor to the output layer for generation of a system output for the neural network input.

Because all of the components of the CGRN are differentiable, the system can train the CGRN by optimizing an objective function using a conventional machine learning training technique, e.g., a stochastic gradient descent with backpropagation through time training technique. That is, the system can perform multiple iterations of the training technique to optimize the objective function by adjusting the values of the parameters of the CGRN, i.e., of the filter banks and biases of the CGRUs and of the output parameter matrix of the output layer.

In some cases, during the training of the CGRN, rather than constraining the value of each parameter of the CGRUs to be shared across all of the time steps, the system divides the time steps into multiple subsets, and only constrains the values of each parameter for the CGRUs to be shared within a subset. That is, for a given subset of time steps and for a given parameter of a given CGRU, the system constrains the parameter to have the same value at each time step in the subset, but allows the value to change for other subsets. Thus, after training, the CGRU applies one set of parameter values to inputs within one subset of the time steps and another set of parameter values to inputs within another subset of the time steps.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers for generating a system output from neural network input, the method comprising:

receiving the neural network input, wherein the neural network input comprises a sequence of embedding vectors, wherein each embedding vector in the sequence represents a corresponding input in a sequence of inputs that are each selected from a vocabulary of inputs, and wherein each embedding vector has dimension m;

initializing a state tensor using the neural network input, wherein the state tensor is a tensor having dimensions x by y by m, wherein x, y, and m are each greater than one, and wherein initializing the state tensor using the system input comprises:

concatenating each embedding vector in the sequence into a first column of the state tensor and setting all other entries of the state tensor to zero, such that the respective embedding vector at each position j in the sequence is added to the state tensor at entries (0,j, 0) through (0,j,m) and the entries in all of the columns 1 through x −1 of the state tensor are set to zero; and processing the state tensor using a convolutional gated recurrent neural network (CGRN) implemented by one or more computers, wherein the CGRN is configured to:

repeatedly update the state tensor by, for each of a plurality of time steps, updating the state tensor by processing the state tensor through a plurality of convolutional gates that each perform a respective convolution between a respective received state tensor and a respective kernel bank; and generating the system output by processing the state tensor after a last time step in the plurality of time steps through an output neural network layer implemented by the one or more computers.

2. The method of claim 1, wherein the CGRN comprises a plurality of convolutional gated recurrent units (CGRUs) arranged in a sequence, and wherein for each time step, the lowest CGRU in the sequence is configured to:

receive the state tensor as of the time step and process the state tensor as of the time step to generate a lowest updated state tensor, and wherein each other CGRU is configured to:
  receive the state tensor as updated by a preceding CGRU in the sequence; and
  update the received state tensor.

3. The method of claim 2, wherein each CGRU comprises a main convolutional gate, and wherein the main convolutional gate is configured to generate a main convolutional gate output u that satisfies $u=\sigma(U'*s+B')$, where $\sigma$ is the sigmoid activation function, s is the state tensor received by the CGRU, $U'*s$ is a convolution of a kernel bank of the main convolutional gate and the state tensor received by the CGRU, and B' is a bias vector for the main convolutional gate.

4. The method of claim 3, wherein each CGRU further comprises a forget convolutional gate, and wherein the forget convolutional gate is configured to generate a forget convolutional gate output r that satisfies $$r=\sigma(U''*s+B''),$$

where s is the state tensor received by the CGRU, $U''*s$ is a convolution of a kernel bank of the forget convolutional gate and the state tensor, and B" is a bias vector for the forget convolutional gate.

5. The method of claim 4, wherein the updated internal state as updated by the CGRU, CGRU(s), satisfies:

$$CGRU(s)=u \cdot s+(1-u) \cdot \tan h(U^*(r \cdot s)+B)$$

where U is a kernel bank of the GRU, B is a bias vector, and r·s signifies pointwise vector multiplication.

6. The method of claim 1, wherein the one or more computers comprise a plurality of computers, and wherein the processing comprises performing a plurality of the operations of the CGRN neural network in parallel across two or more of the plurality of computers.

7. The method of claim 1, wherein the output neural network layer is configured to:
  receive the state tensor after the last time step in the plurality of time steps;
  apply an output parameter matrix to each depth vector of the first column of the state tensor after the last time step in the plurality of time steps to generate a respective initial output vector from each depth vector of the column, wherein each depth vector of the first column corresponds to a respective value of k and is a vector of the entries at (0,k,0) to (0,k,m) of the final state tensor; and
  generate a final output vector that represents the system output by selecting, from each initial output vector, a respective maximal entry from the initial output vector such that the output vector is a vector of the respective maximal entries from each of the initial output vectors.

8. A system comprising one or more computers and one or more storage devices storing instructions that when executed by one or more computers cause the one or more computers to perform operations for generating a system output from a system input, the operations comprising:
  receiving the neural network input, wherein the neural network input comprises a sequence of embedding vectors, wherein each embedding vector in the sequence represents a corresponding input in a sequence of inputs that are each selected from a vocabulary of inputs, and wherein each embedding vector has dimension m;
  initializing a state tensor using the neural network input, wherein the state tensor is a tensor having dimensions x by y by m, wherein x, y, and m are each greater than one, and wherein initializing the state tensor using the system input comprises:
    concatenating each embedding vector in the sequence into a first column of the state tensor and setting all other entries of the state tensor to zero, such that the respective embedding vector at each position j in the sequence is added to the state tensor at entries (0,j,0) through (0,j,m) and the entries in all of the columns 1 through x−1 of the state tensor are set to zero; and
  processing the state tensor using a convolutional gated recurrent neural network (CGRN) implemented by one or more computers, wherein the CGRN is configured to:
    repeatedly update the state tensor by, for each of a plurality of time steps, updating the state tensor by processing the state tensor through a plurality of convolutional gates that each perform a respective convolution between a respective received state tensor and a respective kernel bank; and
  generating the system output by processing the state tensor after a last time step in the plurality of time steps through an output neural network layer implemented by the one or more computers.

9. The system of claim 8, wherein the CGRN comprises a plurality of convolutional gated recurrent units (CGRUs) arranged in a sequence, and wherein for each time step, the lowest CGRU in the sequence is configured to:
  receive the state tensor as of the time step and process the state tensor as of the time step to generate a lowest updated state tensor, and wherein each other CGRU is configured to:
  receive the state tensor as updated by a preceding CGRU in the sequence; and
  update the received state tensor.

10. The system of claim 9, wherein each CGRU comprises a main convolutional gate, and wherein the main convolutional gate is configured to generate a main convolutional gate output u that satisfies $u=\sigma(U'*s+B')$, where $\sigma$ is the sigmoid activation function, s is the state tensor received by the CGRU, $U'*s$ is a convolution of a kernel bank of the main convolutional gate and the state tensor received by the CGRU, and B' is a bias vector for the main convolutional gate.

11. The system of claim 10, wherein each CGRU further comprises a forget convolutional gate, and wherein the forget convolutional gate is configured to generate a forget convolutional gate output r that satisfies $$r=\sigma(U''*s+B''),$$

where s is the state tensor received by the CGRU, $U''*s$ is a convolution of a kernel bank of the forget convolutional gate and the state tensor, and B" is a bias vector for the forget convolutional gate.

12. The system of claim 11, wherein the updated internal state as updated by the CGRU, CGRU(s), satisfies:

$$CGRU(s)=u \cdot s+(1-u) \cdot \tan h(U^*(r \cdot s)+B)$$

where U is a kernel bank of the GRU, B is a bias vector, and r·s signifies pointwise vector multiplication.

13. The system of claim 8, wherein the output neural network layer is configured to:
  receive the state tensor after the last time step in the plurality of time steps;

apply an output parameter matrix to each depth vector of the first column of the state tensor after the last time step in the plurality of time steps to generate a respective initial output vector from each depth vector of the column, wherein each depth vector of the first column corresponds to a respective value of k and is a vector of the entries at (0,k,0) to (0,k,m) of the final state tensor; and generate a final output vector that represents the system output by selecting, from each initial output vector, a respective maximal entry from the initial output vector such that the output vector is a vector of the respective maximal entries from each of the initial output vectors.

14. One or more non-transitory computer-readable storage media storing instructions that when executed by one or more computers cause the one or more computers to perform operations for generating a system output from a system input, the operations comprising:

receiving the neural network input, wherein the neural network input comprises a sequence of embedding vectors, wherein each embedding vector in the sequence represents a corresponding input in a sequence of inputs that are each selected from a vocabulary of inputs, and wherein each embedding vector has dimension m;

initializing a state tensor using the neural network input, wherein the state tensor is a tensor having dimensions x by y by m, wherein x, y, and m are each greater than one, and wherein initializing the state tensor using the system input comprises:

concatenating each embedding vector in the sequence into a first column of the state tensor and setting all other entries of the state tensor to zero, such that the respective embedding vector at each position j in the sequence is added to the state tensor at entries (0,j,0) through (0,j,m) and the entries in all of the columns 1 through x−1 of the state tensor are set to zero; and processing the state tensor using a convolutional gated recurrent neural network (CGRN) implemented by one or more computers, wherein the CGRN is configured to:

repeatedly update the state tensor by, for each of a plurality of time steps, updating the state tensor by processing the state tensor through a plurality of convolutional gates that each perform a respective convolution between a respective received state tensor and a respective kernel bank; and generating the system output by processing the state tensor after a last time step in the plurality of time steps through an output neural network layer implemented by the one or more computers.

15. The non-transitory computer-readable storage media of claim 14, wherein the CGRN comprises a plurality of convolutional gated recurrent units (CGRUs) arranged in a sequence, and wherein for each time step, the lowest CGRU in the sequence is configured to:

receive the state tensor as of the time step and process the state tensor as of the time step to generate a lowest updated state tensor, and wherein each other CGRU is configured to:

receive the state tensor as updated by a preceding CGRU in the sequence; and update the received state tensor.

16. The non-transitory computer-readable storage media of claim 15, wherein each CGRU comprises a main convolutional gate, and wherein the main convolutional gate is configured to generate a main convolutional gate output u that satisfies $u=\sigma(U'*s+B')$, where $\sigma$ is the sigmoid activation function, s is the state tensor received by the CGRU, $U'*s$ a convolution of a kernel bank of the main convolutional gate and the state tensor received by the CGRU, and B' is a bias vector for the main convolutional gate.

17. The non-transitory computer-readable storage media of claim 16, wherein each CGRU further comprises a forget convolutional gate, and wherein the forget convolutional gate is configured to generate a forget convolutional gate output r that satisfies $$r=\sigma(U'''*s+B''),$$

where s is the state tensor received by the CGRU, $U'''*s$ is a convolution of a kernel bank of the forget convolutional gate and the state tensor, and B'' is a bias vector for the forget convolutional gate.

18. The non-transitory computer-readable storage media of claim 17, wherein the updated internal state as updated by the CGRU, CGRU(s), satisfies:

$$CGRU(s)=u \cdot s+(1-u) \cdot \tan h(U*(r \cdot s)+B)$$

where U is a kernel bank of the GRU, B is a bias vector, and r·s signifies pointwise vector multiplication.

19. The non-transitory computer-readable storage media of claim 14, wherein the output neural network layer is configured to:

receive the state tensor after the last time step in the plurality of time steps;

apply an output parameter matrix to each depth vector of the first column of the state tensor after the last time step in the plurality of time steps to generate a respective initial output vector from each depth vector of the column, wherein each depth vector of the first column corresponds to a respective value of k and is a vector of the entries at (0,k,0) to (0,k,m) of the final state tensor; and generate a final output vector that represents the system output by selecting, from each initial output vector, a respective maximal entry from the initial output vector such that the output vector is a vector of the respective maximal entries from each of the initial output vectors.

* * * * *

UNITED STATES PATENT AND TRADEMARK OFFICE
CERTIFICATE OF CORRECTION

PATENT NO. : 10,977,547 B2
APPLICATION NO. : 15/349867
DATED : April 13, 2021
INVENTOR(S) : Kaiser et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 718 days.

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*